US006961726B1

(12) United States Patent
Eisenberg et al.

(10) Patent No.: US 6,961,726 B1
(45) Date of Patent: Nov. 1, 2005

(54) METHOD OF, SYSTEM FOR, AND COMPUTER PROGRAM PRODUCT FOR STORING, RETRIEVING, AND USING REMOTE HOST FILE ATTRIBUTES ON A LOCAL FILE SYSTEM

(75) Inventors: Neal R. Eisenberg, San Jose, CA (US); Brent C. Hawks, Hollister, CA (US); Gary I. Mazo, San Jose, CA (US); Ira L. Sheftman, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/579,866

(22) Filed: May 25, 2000

(51) Int. Cl.[7] ............................................. G06F 7/00
(52) U.S. Cl. ..................... 707/10; 707/205; 709/229
(58) Field of Search ............................ 707/205, 8, 10; 709/229

(56) References Cited

U.S. PATENT DOCUMENTS

| | | | | |
|---|---|---|---|---|
| 5,452,447 | A | 9/1995 | Nelson et al. | 395/650 |
| 5,561,799 | A | 10/1996 | Khalidi et al. | 395/600 |
| 5,737,495 | A | 4/1998 | Adams et al. | 395/615 |
| 5,745,748 | A | 4/1998 | Ahmad et al. | 395/610 |
| 5,838,916 | A | 11/1998 | Domenikos et al. | 395/200.49 |
| 5,933,835 | A | 8/1999 | Adams et al. | 707/104 |
| 5,940,841 | A * | 8/1999 | Schmuck et al. | 707/202 |
| 5,948,062 | A * | 9/1999 | Tzelnic et al. | 707/10 |
| 5,987,471 | A * | 11/1999 | Bodine et al. | 345/764 |
| 6,314,235 | B1 * | 11/2001 | Gotoh et al. | 386/116 |
| 6,324,581 | B1 * | 11/2001 | Xu et al. | 707/10 |

FOREIGN PATENT DOCUMENTS

JP          6231029 A2     8/1994     ........... G06F 12/00

OTHER PUBLICATIONS

Phillips, Ken, "NFS Protocol Sprouts Wings; Efficiency and URL Mounts Should Open NFS to Thin Client, Net Deployment", PC Week Jun. 23, 1997 v14, n26 p 116 (2), pp 1-3.
Phillips, Ken, "Rivals Blend Unix, Windows", PC Week Nov. 17, 1997 v14, n48 p. A29 (5), pp 1-9.

* cited by examiner

Primary Examiner—Greta Robinson
Assistant Examiner—Sathyanarayan Pannala
(74) Attorney, Agent, or Firm—Prentiss R. Johnson; David W. Victor; Konrad Raynes & Victor LLP (57) ABSTRACT

Remote file attributes are retrieved, stored, and accessed for use on a local data processing system's installable file system. The remote file attributes are first obtained on a remote host by a communication program located on the remote host. The remote file attributes are then transferred to a client communication program on the local data processing system via a message. The client communication program uses the local data processing system's shared storage mechanisms to save the remote file attributes and to make them available to other processes executing on the local data processing system. The remote file attributes have an associated lifetime or duration on the local data processing system. This lifetime is pre-determined by the client communication program as to not to exceed a certain time limit, and the remote file attributes are cleared when this maximum lifetime is reached. This clearing causes periodic synchronization between the remote file attributes stored on the local data processing system and the remote file attributes on the host.

15 Claims, 4 Drawing Sheets

METHOD OF, SYSTEM FOR, AND COMPUTER PROGRAM PRODUCT FOR STORING, RETRIEVING, AND USING REMOTE HOST FILE ATTRIBUTES ON A LOCAL FILE SYSTEM

BACKGROUND OF THE INVENTION

1. Field of the Invention

The present invention relates in general to computer file systems, and more particularly to retrieving, storing, and using file attributes from one file system in another file system.

2. Description of the Related Art

Data processing systems usually store information in files. A file is a named set or collection of records, logical records, data, or information stored, retrieved, or processed as a unit. Such a file may have various characteristics, and these characteristics may be described by an attribute. An attribute is a specific characteristic that identifies and describes properties of a managed object. The characteristic can be determined, and possibly changed, through operations on the managed object. For example, a file may have attributes that define it as hidden or read-only. Thus, any of the attributes that describe the characteristics of a file are known as file attributes.

Not all file systems share a common identical set of file attributes. For example, a first file system may provide file attributes such as read-only or hidden; whereas, a second file system may not support these file attributes. If a user of the second file system attempts to access files on the first file system, then the second file system will not recognize or appropriately process the file attributes from the first file system.

More specifically, in workstation file systems, externally accessible file attributes are those that can be queried and/or modified by an application programmer using a public application programming interface (PAPI) as opposed to internal functions of the operating system. These are normally implemented as bits that are set on or off, or as integer values in fixed size multi-bit fields such as a four-byte integer. The number of attributes is limited by implementation of the native workstation file system. Installable distributed file systems (that is, file systems that can access files on remote computers) can present difficulties when attempting to convey file attributes that are not present in the local native workstation file system.

Conventional file attributes in workstation operating systems such as the WINDOWS 95™ operating system (releases 1 and 2) and the WINDOWS 98™ operating system (first and second editions) have been carried over from earlier operating systems such as Disk Operating System (DOS) (MICROSOFT, WINDOWS, WINDOWS NT, and the WINDOWS logo are trademarks of Microsoft Corporation in the United States, other countries, or both.). Modern operating systems such as the OS/2® operating system (release 1 through Warp 4) and the WINDOWS NT™ operating system (version 3.1 through 4.0) introduced "extended" attributes that are represented by an extended set of flags or integer values. Remote host file attributes (such as record format, logical record length, or sequence numbers in MVS® data sets (version 1 through ESA)) can be used by the workstation tools (such as workstation textual editors, for example the IBM® LPEX editor (versions 1 through 4)) to provide additional information to the user and additional functionality to the tools. (IBM®, MVS®, and OS/2® are registered trademarks of International Business Machines Corporation in the United States, other countries, or both.). For example, a textual editor can detect use of sequence numbers in an MVS file and adjust its behavior so that editing of the sequence number area in the file is prohibited by the user. The editor then can automatically adjust sequence numbers when the lines in the file are added or deleted on the workstation. Remote file attributes cannot be represented with workstation file system's conventional or extended file attributes. Existing methods of providing extended information in workstation files normally apply only to files that physically reside on the workstation file systems. Such attributes are normally stored as integral part of the file. Those files are textual files whose formats are specific to the editors that use those formats. For example, the MICROSOFT™ WORD editor (versions 1 through 9) uses its own file format, and the LOTUS® WORD PRO® editor (versions 1 through 9) uses yet another format (LOTUS® and WORD PRO® are registered trademarks of Lotus Development Corporation.). Those formats cannot be applied to the remote host files because those files reside on the remote host and are not cached on the workstation in any useable form. The formats and textual encoding on the host are host specific, for example, Extended Binary-Coded Decimal Interchange Code (EBCDIC) encoding on an IBM S/390® computer system (S/390® is a registered trademark of International Business Machines Corporation in the United States, other countries, or both.

Thus, there is a clearly felt need for a method, system, and program product for storing and accessing remote file attributes on a workstation's installable file system.

SUMMARY OF THE INVENTION

The present invention comprises a method, system, article of manufacture, and/or program product for retrieving, storing, and accessing remote file attributes for use on a data processing system's installable file system. The remote file attributes are first obtained on a remote host by a communication program located on the remote host. The remote file attributes are then transferred to a client communication program on the data processing system via a message, preferably a Hyper Text Transfer Protocol (HTTP) message. The client communication program uses the data processing system's shared storage mechanisms to save the remote file attributes and to make them available to other processes executing on the workstation. The remote file attributes have an associated lifetime or duration on the data processing system. This lifetime is pre-determined by the client communication program as to not to exceed a certain time limit, and the remote file attributes are cleared when this maximum lifetime is reached. This clearing causes periodic synchronization between the remote file attributes stored on the data processing system and the remote file attributes stored on the host.

One aspect of a preferred embodiment of the present invention provides an extensible file access method for accessing a foreign file system from a workstation data processing system with a native file system, said foreign file system being located on a remote data processing system, said foreign file system having a set of foreign file attributes corresponding to each of a plurality of files in the foreign file system, and said native file system having a set of native file attributes corresponding to each of a plurality of files in the native file system, said method comprising the steps of: generating a request from a client on the workstation to the remote data processing system to open a foreign file in the foreign file system; opening of the foreign file by the foreign file system; sending of the file attributes of the foreign file, hereinafter foreign file attributes, to the workstation; storing of the foreign file attributes by the workstation; accessing of the foreign file attributes stored in the workstation by the workstation client to process the foreign file; and processing by the workstation client the foreign file using the stored foreign file attributes.

In accordance with another aspect of a preferred embodiment of the present invention, a subset of the foreign file attributes which are equivalent to a corresponding subset of file attributes of the native file system is determined, the subset of the foreign file attributes hereinafter known as conventional file attributes; the conventional file attributes are returned to the client; and a remaining subset of the foreign file attributes which are not equivalent to a corresponding subset of file attributes of the native file system are stored, the remaining subset of the foreign file attributes hereinafter known as extended file attributes.

In accordance with another aspect of a preferred embodiment of the present invention, the client accesses the foreign file via a protocol of the native file system, the accessing being performed in a similar manner to accessing a native file system file; and the client accesses the foreign file by use of the extended file attributes, the accessing being performed via a protocol different from the native file system protocol.

In accordance with another aspect of a preferred embodiment of the present invention, an expiration timer corresponding to the extended file attributes is started; and the extended file attributes are removed from the workstation storage after the expiration of the expiration timer.

In accordance with another aspect of a preferred embodiment of the present invention, the sending of the foreign file attributes is performed by a web server located on the remote system, the web server being capable of sending and receiving messages via a network.

In accordance with another aspect of a preferred embodiment of the present invention, the extended file attributes are stored in a shared memory portion of the workstation storage which is accessible by the client and other workstation processes; a unique handle is associated with the extended file attributes; and the unique handle is provided to a workstation process to enable the workstation process to access the extended file attributes.

A preferred embodiment of the present invention has the advantage of providing improved extended file attributes.

A preferred embodiment of the present invention has the advantage of providing additional information beyond that provided by native file attributes.

A preferred embodiment of the present invention has the advantage of allowing additional functionality using the additional information beyond that provided by native file attributes.

A preferred embodiment of the present invention has the advantage of allowing non-native extended file attributes to be used on a computer system.

A preferred embodiment of the present invention has the advantage of allowing host extended file attributes to be used on a workstation.

BRIEF DESCRIPTION OF THE DRAWINGS

For a more complete understanding of the present invention and the advantages thereof, reference is now made to the Description of the Preferred Embodiment in conjunction with the attached Drawings, in which.

DESCRIPTION OF THE PREFERRED EMBODIMENT

Figure 1:
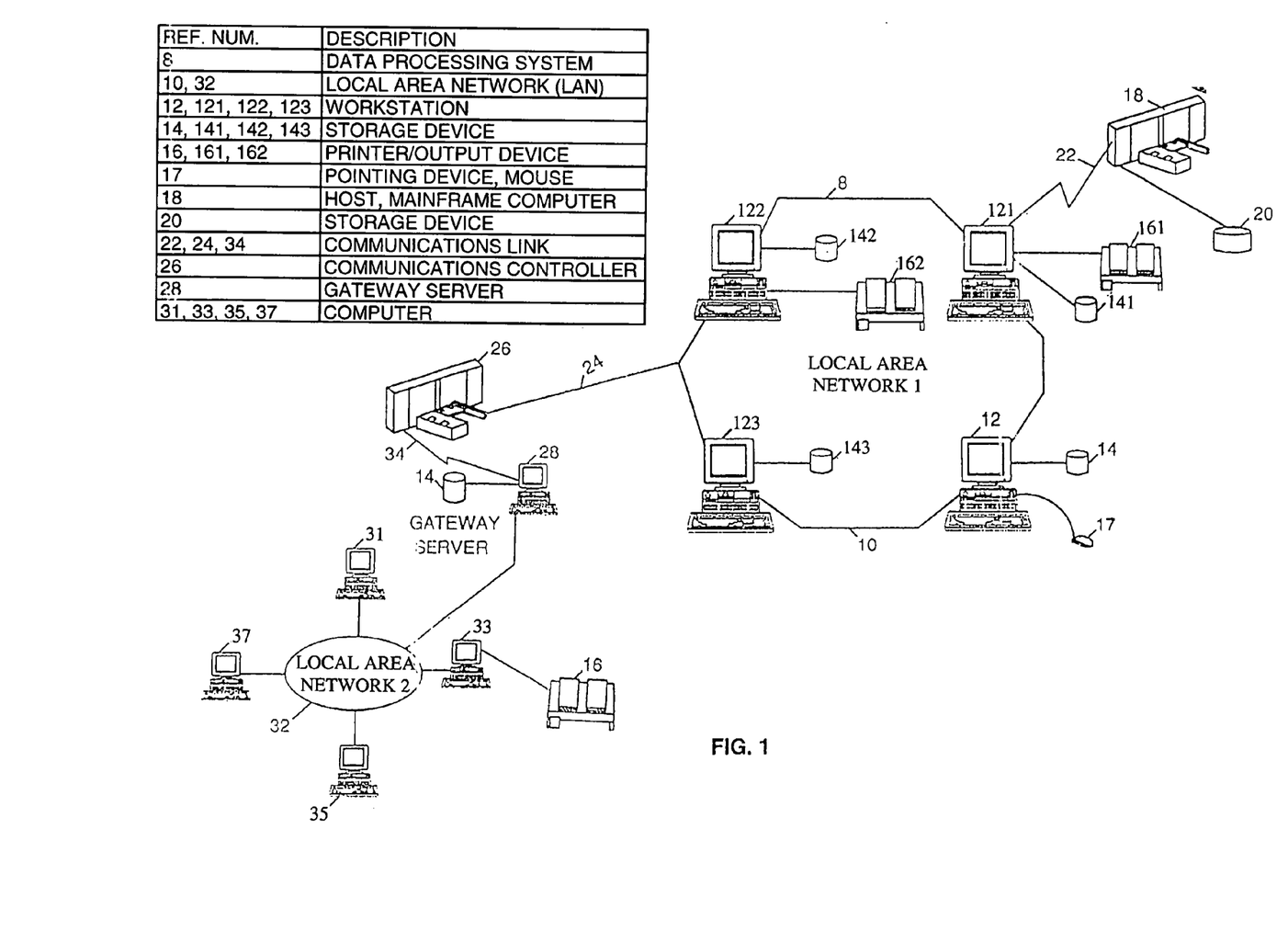
FIG. 1 is a block diagram of a distributed computer system used in performing the method of the present invention, forming part of the apparatus of the present invention, and which may use the article of manufacture comprising a computer-readable storage medium having a computer program embodied in said medium which may cause the computer system to practice the present invention.

Referring first to FIG. 1, there is depicted a graphical representation of a data processing system 8, which may be utilized to implement the present invention. As may be seen, data processing system 8 may include a plurality of networks, such as Local Area Networks (LAN), Local Area Network1 10 and Local Area Network2 32, each of which preferably includes a plurality of individual computers 12, 121, 122, and 123, and 31, 33, 35, and 37, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14, 141, 142, and 143, and/or a printer/output device 16, 161, and 162, and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

As will be appreciated upon reference to the foregoing, it is often desirable for a user to perform host application development on a workstation 12 in lieu of performing the application development on the host 18 itself. Remote Edit/Compile/Debug provides such a workstation environment for performing the edit, compile, and debug tasks associated with host application development. Host application parts, such as COBOL source code, COBOL copy books, and host JCL, may be stored in PDS or PDSE data sets on storage device 20 connected to the host 18. The Remote Edit/Compile/Debug workstation environment allows these files to be accessed and used on the workstation 12. The present invention provides for such access and use of host files on the workstation 12 by retrieving file attributes associated with files stored on the file system 20 of the host 18, storing these remote file attributes on the workstation 12, and making the remote file attributes available to processes executing on the workstation 12 to support a scenario such as the Remote Edit/Compile/Debug.

Figure 2:
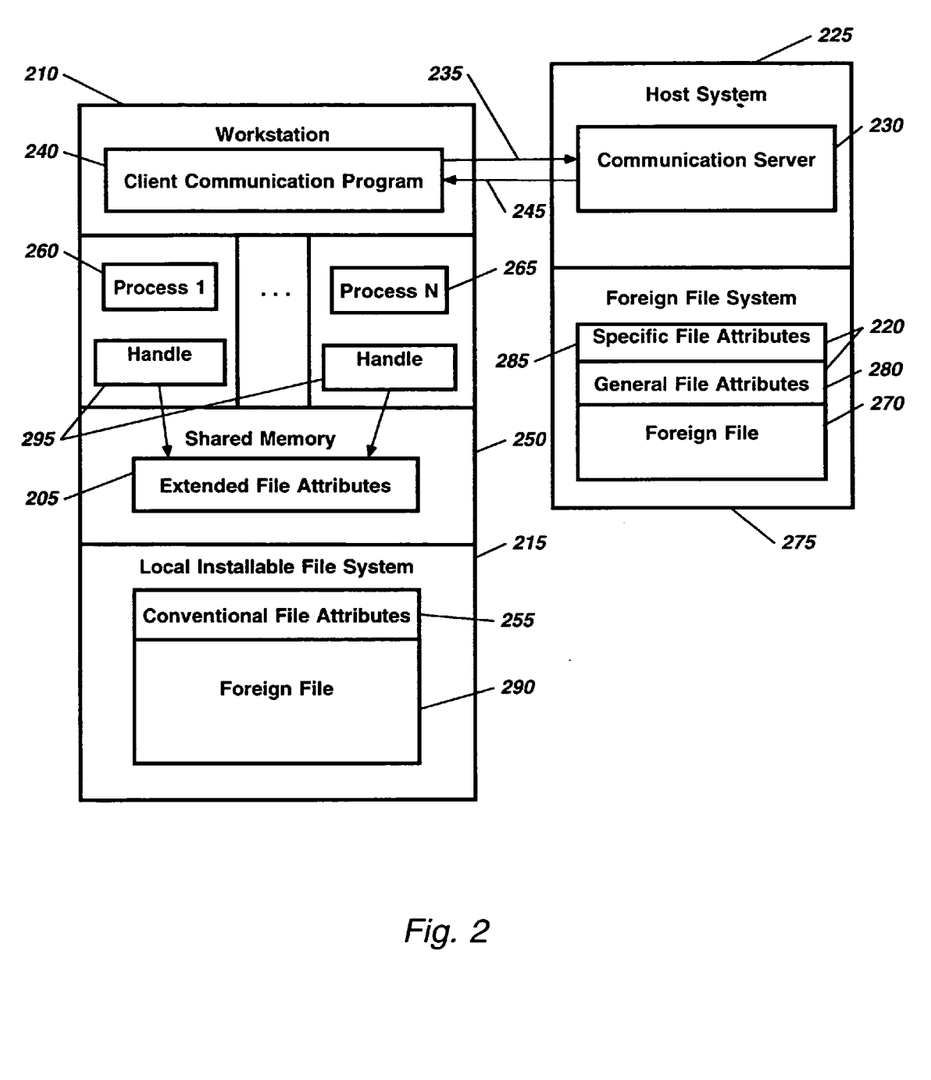
FIG. 2 is a block diagram of a portion of memory of the distributed computer system.

Referring next to FIG. 2, a preferred embodiment of the present invention is illustrated. This embodiment comprises a method for storing and accessing remote file attributes 205 on a workstation's 210 installable file system 215. In the present invention, the remote file attributes 220 are first obtained on the remote host 225 by a communication program 230 in response to a request 235 from the client communication program 240 on the workstation 210. The remote file attributes are then transferred to the client communication program 240 via a message 245. The client communication program 240 uses the workstation's 210 shared storage 250 mechanisms to save the attributes 205 and make them available to other processes 260 and 265 on the workstation 210. The lifetime of the attributes 205 on the workstation 210 is pre-determined by the client communication program 240 as to not to exceed a certain time limit after which the attributes 205 are cleared. This clearing is necessary to force periodic synchronization between corresponding workstation attributes 205 and host attributes 220.

Figure 3:
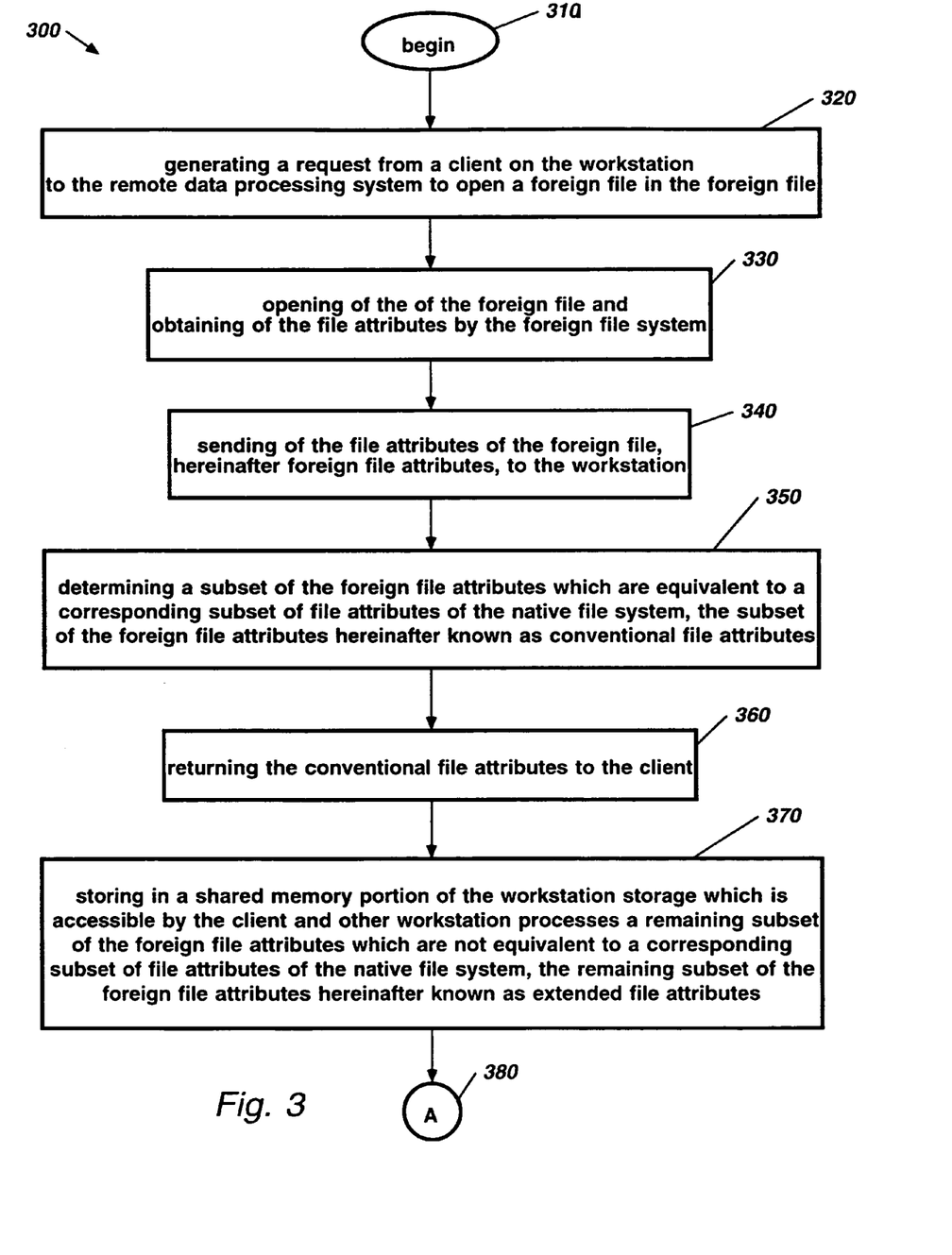
FIGS. 3 and 4 are flowcharts illustrating the operations preferred in carrying out a preferred embodiment of the present invention.
Figure 4:
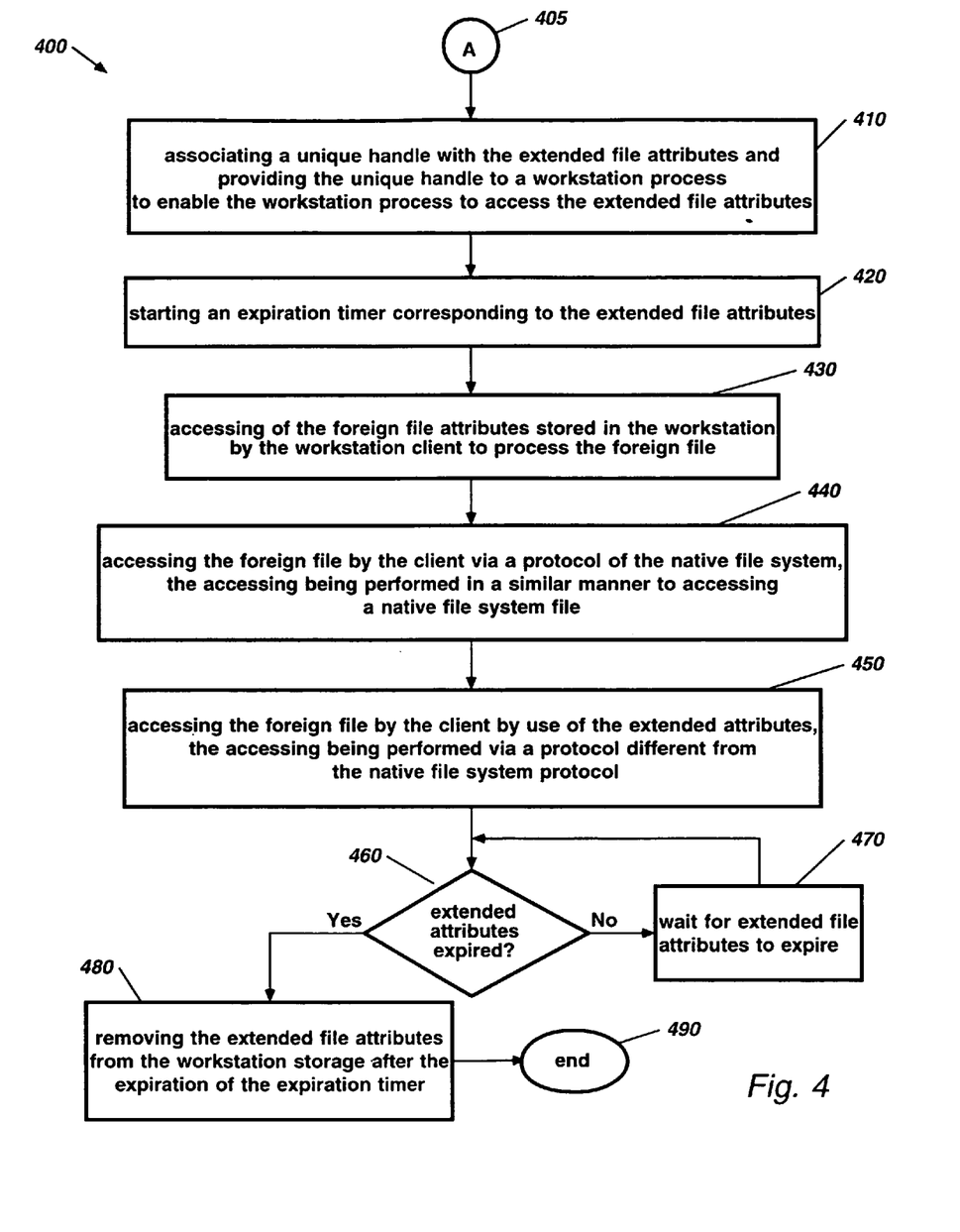

Referring now to FIGS. 3 and 4, the flowcharts illustrate the operations preferred in carrying out the preferred embodiment of the present invention. In the flowcharts, the graphical conventions of a diamond for a test or decision and a rectangle for a process or function are used. These conventions are well understood by those skilled in the art, and the flowcharts are sufficient to enable one of ordinary skill to write code in any suitable computer programming language.

Referring first to FIG. 3, the process 300 of supporting remote file attributes on the workstation file system begins at process block 310. Thereafter, process block 320 generates a request 235 from a client communication program 240 on the workstation 210 to the remote data processing system 225 to open a foreign file 270 in the foreign file system 275. This request 235 may result from an editor attempting to edit the foreign file or remote file. Responsive to the remote host's receiving of the request 235 to open the foreign file 270, process block 330 causes the foreign file system 275 to open the foreign file 270. Process block 330 also causes the remote host 225 to obtain the file attributes 220 of the opened foreign file 270. The file attributes 220 may be of a general type 280 such as creation date, modification date, or size. Alternatively, the file attributes may be of a type 285 specific to certain types of host files such as record format, record length, revision/modification level, and sequence numbers. Thereafter, process block 340 sends 245 the file attributes of the foreign file, hereinafter foreign file attributes, to the workstation 210. Preferably, the foreign file attributes are sent by a host communication process 230 to the workstation 210 as part of a response 245 to the request 235 to open the file 270. The host communication process 230 is preferably a web server capable of sending and receiving HTTP messages. The response is preferably sent in a form of an HTTP message.

The HTTP response 245 is received by the workstation communication program 240, preferably an IBM Foreign File System client process. Process block 350 determines a subset of the foreign file attributes which are equivalent to a corresponding subset of file attributes of the native file system, the subset of the foreign file attributes hereinafter known as conventional file attributes 255. Responsive to this determination, process block 360 returns the conventional file attributes 255 to the client operating system as part of a standard file system protocol, preferably, Server Message Block (SMB) protocol. Process block 370 stores a remaining subset of the foreign file attributes which are not equivalent to a corresponding subset of file attributes of the native file system, the remaining subset of the foreign file attributes hereinafter known as extended file attributes 205. The extended host file attributes 205 are stored in a persistent shared storage 250, preferably a shared memory segment of the workstation operating system which is accessible by the client 240 and other workstation processes 260 and 265. Thereafter, processing continues to process block 410 on FIG. 4. This processing path is illustrated by flowchart connectors A, 380 on FIGS. 3 and 405 on FIG. 4.

To enable interested workstation processes 260 and 265 to access the extended file attributes 205 stored in the persistent shared storage 250, process block 410 associates a unique handle 295 with the extended file attributes 205 and provides the unique handle 295 to the interested workstation processes 260 and 265. All interested processes 260 and 265 on the workstation 210 obtain a unique name and, through it, a unique handle 295 to the shared memory segment 250 containing the extended file attributes 205 of the file. The unique name of the shared memory segment within the client system is unique because it is derived from the universal naming convention (UNC) name of the file. After the extended file attributes 205 are stored in the persistent shared storage 250, process block 420 starts an expiration timer corresponding to the extended file attributes. The expiration timer allows the extended file attributes 205 to expire and to become refreshed the next time a workstation process requests to open the host file. The expiration timer also synchronizes the extended attribute information every time the file is opened, and if the expiration timer expires, then the information will be cleared and the shared memory segment will be freed.

In process block 430, the workstation client 260 accesses the foreign file attributes 205 by accessing the named persistent shared storage 250 to process the foreign file 290. In process block 440, the client then accesses the foreign file 290 via a protocol of the native file system 215, the accessing being performed in a similar manner to accessing a native file system file. Alternatively, the client 260 may access the foreign file 290 by use of the extended file attributes 205, the accessing being performed via a protocol different from the native file system protocol, as shown in process block 450.

In decision block 460, the workstation client communication process 240 determines if the extended file attributes expiration timer has expired. If not, process block 470 then waits for the extended file attributes to expire. Referring back to process block 460, if the expiration timer has expired, then the workstation client communication program 240 in process block 480 clears or removes the extended file attributes 205 from the workstation storage 250 after the expiration of the expiration timer. The process then ends at process block 490.

Using the foregoing specification, the invention may be implemented using standard programming and/or engineering techniques using computer programming software, firmware, hardware or any combination or sub-combination thereof. Any such resulting program(s), having computer readable program code means, may be embodied within one or more computer usable media such as fixed (hard) drives, disk, diskettes, optical disks, magnetic tape, semiconductor memories such as read-only memory (ROM), programmable read-only memory (PROM), etc., or any memory or transmitting device, thereby making a computer program product, i.e., an article of manufacture, according to the invention. The article of manufacture containing the computer programming code may be made and/or used by executing the code directly or indirectly from one medium, by copying the code from one medium to another medium, or by transmitting the code over a network. An apparatus for making, using, or selling the invention may be one or more processing systems including, but not limited to, central processing unit (CPU), memory, storage devices, communication links, communication devices, servers, input/output (I/O) devices, or any sub-components or individual parts of one or more processing systems, including software, firmware, hardware or any combination or sub-combination thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system and/or computer sub-components embodying the invention and to create a computer system and/or computer sub-components for carrying out the method of the invention. Although the present invention has been particularly shown and described with reference to a preferred embodiment, it should be apparent that modifications and adaptations to that embodiment may occur to one skilled in the art without departing from the spirit or scope of the present invention as set forth in the following claims.

We claim:

1. An extensible file access method for accessing a foreign file system from a local data processing system with a native file system, said foreign file system being located on a remote data processing system, said foreign file system having a set of foreign file attributes corresponding to each of a plurality of files in the foreign file system, and said native file system having a set of native file attributes corresponding to each of a plurality of files in the native file system, said method comprising:

generating a request from a client on the local data processing system to the remote data processing system to open a foreign file in the foreign file system;

opening of the foreign file by the foreign file system;

sending of file attributes of the foreign file, hereinafter foreign file attributes, to the local data processing system;

storing of the foreign file attributes by the local data processing system;

determining a subset of the foreign file attributes which are equivalent to a corresponding subset of file attributes of the native file system, the subset of the foreign file attributes hereinafter known as conventional file attributes;

returning the conventional file attributes to the client;

storing a remaining subset of the foreign file attributes which are not equivalent to a corresponding subset of file attributes of the native file system, the remaining subset of the foreign file attributes hereinafter known as extended file attributes;

accessing of the foreign file attributes stored in the local data processing system by the local data processing system client to process the foreign file; and processing by the local data processing system client the foreign file using the stored foreign file attributes.

2. The method of claim 1, further comprising:

accessing of the foreign file by the client via a protocol of the native file system, the accessing being performed in a similar manner to accessing a file in the native file system; and accessing of the foreign file by the client by use of the extended file attributes, the accessing being performed via a protocol different from the native file system protocol.

3. The method of claim 1, further comprising:

storing the extended file attributes in a shared memory portion of the local data processing system storage which is accessible by the client and other local data processing system processes;

associating a unique handle with the extended file attributes; and providing the unique handle to a local data processing system process to enable the local data processing system process to access the extended file attributes.

4. The method of claim 1 wherein the sending of the foreign file attributes is performed by a web server located on the remote system, the web server being capable of sending and receiving Messages via a network.

5. The method of claim 1, further comprising:

storing the extended file attributes in a shared memory portion of the local data processing system storage which is accessible by the client and other local data processing system processes;

associating a unique handle with the extended file attributes; and providing the unique handle to a local data processing system process to enable the local data processing system process to access the extended file attributes.

6. An article of manufacture for use in a computer system for accessing a foreign file system from a local data processing system with a native file system, said foreign file system being located on a remote data processing system, said foreign file system having a set of foreign file attributes corresponding to each of a plurality of files in the foreign file system, and said native file system having a set of native file attributes corresponding to each of a plurality of files in the native file system, said article of manufacture comprising a computer-readable storage medium having a computer program embodied in said medium which causes the computer system to perform operations, the operations comprising:

generating a request from a client on the local data processing system to the remote data processing system to open a foreign file in the foreign file system;

opening of the foreign file by the foreign file system;

sending of file attributes of the foreign file, hereinafter foreign file attributes, to the local data processing system;

storing of the foreign file attributes by the local data processing system;

determining a subset of the foreign file attributes which are equivalent to a corresponding subset of file attributes of the native file system, the subset of the foreign file attributes hereinafter known as conventional file attributes;

returning the conventional file attributes to the client;

storing a remaining subset of the foreign file attributes which are not equivalent to a corresponding subset of file attributes of the native file system, the remaining subset of the foreign file attributes hereinafter known as extended file attributes:

accessing of the foreign file attributes stored in the local data processing system by the local data processing system client to process the foreign file; and processing by the local data processing system client the foreign file using the stored foreign file attributes.

7. The article of manufacture of claim 6, wherein the operations further comprise:

accessing of the foreign file by the client via a protocol of the native file system, the accessing being performed in a similar manner to accessing a file in the native file system; and accessing of the foreign file by the client by use of the extended file attributes, the accessing being performed via a protocol different from the native file system protocol.

8. The article of manufacture of claim 6, wherein the operations further comprise:

starting an expiration timer corresponding to the extended file attributes in response to storing the extended attributes; and removing the extended file attributes from the local data processing system storage after the expiration of an expiration timer.

9. The article of manufacture of claim 6, wherein the sending of the foreign file attributes is performed by a web server located on the remote system, the web server being capable of sending and receiving messages via a network.

10. The article of manufacture of claim 6, wherein the operations further comprise:

storing the extended file attributes in a shared memory portion of the local data processing system storage which is accessible by the client and other local data processing system processes;

associating a unique handle with the extended file attributes; and providing the unique handle to a local data processing system process to enable the local data processing system process to access the extended file attributes.

11. A distributed computer system for accessing a foreign file system from a local data processing system with a native file system, said foreign file system being located on a remote data processing system, said foreign file system having a set of foreign file attributes corresponding to each of a plurality of files in the foreign file system, and said native file system having a set of native file attributes corresponding to each of a plurality of files in the native file system, said distributed computer system comprising:

a requestor for generating a request from a client on the local data processing system to the remote data processing system to open a foreign file in the foreign file system;

a foreign file which can be opened by the foreign file system;

a sender for sending file attributes of the foreign file, hereinafter foreign file attributes, to the local data processing system;

storage for storing of the foreign file attributes by the local data processing system;

a comparator for determining a subset of the foreign file attributes which are equivalent to a corresponding subset of file attributes of the native file system, the subset of the foreign file attributes hereinafter known as conventional file attributes;

a data transfer for returning the conventional file attributes to the client;

storage for storing a remaining subset of the foreign file attributes which are not equivalent to a corresponding subset of file attributes of the native file system, the remaining subset of the foreign file attributes hereinafter known as extended file attributes;

a file access for accessing the foreign file attributes stored in the local data processing system by the local data processing system client to process the foreign file; and a processor for processing by the local data processing system client the foreign file using the stored foreign file attributes.

12. The distributed computer system of claim 11, further comprising:

a file access for accessing by the client the foreign file via a protocol of the native file system, the accessing being performed in a similar manner to accessing a file in the native file system; and a file access for accessing by the client the foreign file by use of the extended file attributes, the accessing being performed via a protocol different from the native file system protocol.

13. The distributed computer system of claim 11 wherein the storage further comprises:

an expiration timer corresponding to the extended file attributes; and storage access for removing the extended file attributes from the local data processing system storage after the expiration of an expiration timer.

14. The distributed computer system of claim 11, wherein the sender of the foreign file attributes is a web server located on the remote system, the web server being capable of sending and receiving messages via a network.

15. The distributed computer system of claim 11 farther comprising:

a shared memory portion of the local data processing system storage which is accessible by the client and other local data processing system processes for storing the extended file attributes;

a unique handle associated with the extended file attributes; and a local data processing system process which uses the unique handle to enable the local data processing system process to access the extended file attributes.

* * * * *

UNITED STATES PATENT AND TRADEMARK OFFICE
CERTIFICATE OF CORRECTION

| | |
|---|---|
| PATENT NO. | : 6,961,726 B1 |
| APPLICATION NO. | : 09/579866 |
| DATED | : November 1, 2005 |
| INVENTOR(S) | : Neal R. Eisenberg et al. |

Page 1 of 1

It is certified that error appears in the above-identified patent and that said Letters Patent is hereby corrected as shown below:

<u>Column 8</u>

Line 40, delete "Messages" and insert -- messages -- .

<u>Column 10</u>, line 46, delete "an expiration" and insert -- the expiration -- .

Line 51, delete "farther" and insert -- further -- .

Signed and Sealed this

Twenty-fourth Day of April, 2007

JON W. DUDAS
*Director of the United States Patent and Trademark Office*